United States Patent [19]

Woolman et al.

[11] Patent Number: 4,644,855
[45] Date of Patent: Feb. 24, 1987

[54] BEVERAGE PRODUCTION

[75] Inventors: Paul Woolman, Stoke Poges; Barry Seward, Hook, both of England

[73] Assignee: Mars G.B. Limited, London, England

[21] Appl. No.: 818,792

[22] Filed: Jan. 14, 1986

Related U.S. Application Data

[62] Division of Ser. No. 513,229, Jul. 13, 1983, Pat. No. 4,581,239.

[30] Foreign Application Priority Data

Jul. 19, 1982 [GB] United Kingdom ................ 8220855
Apr. 27, 1983 [GB] United Kingdom ................ 8311542

[51] Int. Cl.[4] ........................ A47J 31/06; A47J 31/32
[52] U.S. Cl. ...................................... 99/280; 99/287; 99/302 R
[58] Field of Search ................ 99/279, 283, 287, 292, 99/300, 302 R; 426/433, 431, 435

[56] References Cited

U.S. PATENT DOCUMENTS

| 3,371,592 | 3/1968 | Remy | 99/307 |
| 3,423,209 | 1/1969 | Weber | 99/299 |
| 3,478,670 | 11/1969 | Fuqua | 99/283 |
| 3,530,787 | 9/1970 | Litterio | 99/299 |
| 3,812,273 | 5/1974 | Heinrich | 426/433 |
| 4,143,589 | 3/1979 | Weber | 99/302 R |
| 4,189,991 | 2/1980 | Haddad | 99/302 R |
| 4,208,957 | 6/1980 | Bollmann | 99/299 |

Primary Examiner—Robert W. Jenkins
Attorney, Agent, or Firm—Curtis, Morris & Safford

[57] ABSTRACT

A method and apparatus for producing a beverage from an infusible material such as coffee or tea by contacting the material with aqueous medium such as hot water in successive discrete portions, each successive portion re-suspending and re-agitating the material to increase extraction efficiency. The infusible material is preferably enclosed in a disposable brewing container such as a sachet or capsule, the aqueous medium injected therein in successive cycles.

9 Claims, 7 Drawing Figures

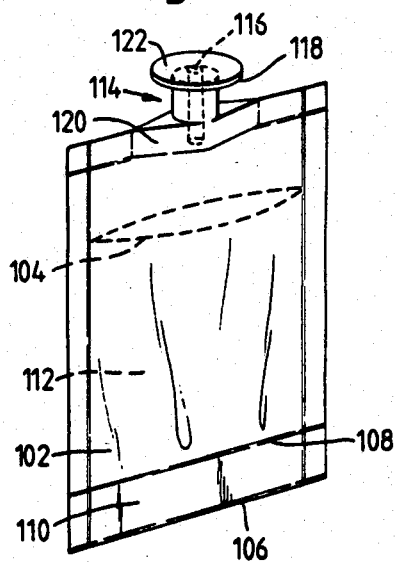
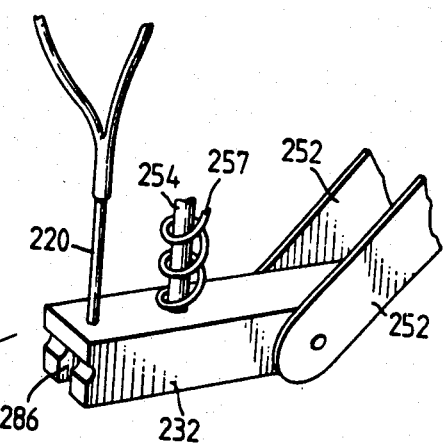
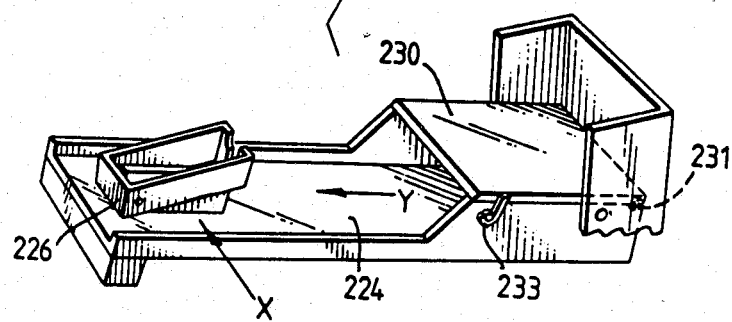
Fig. 1.
Fig. 3.

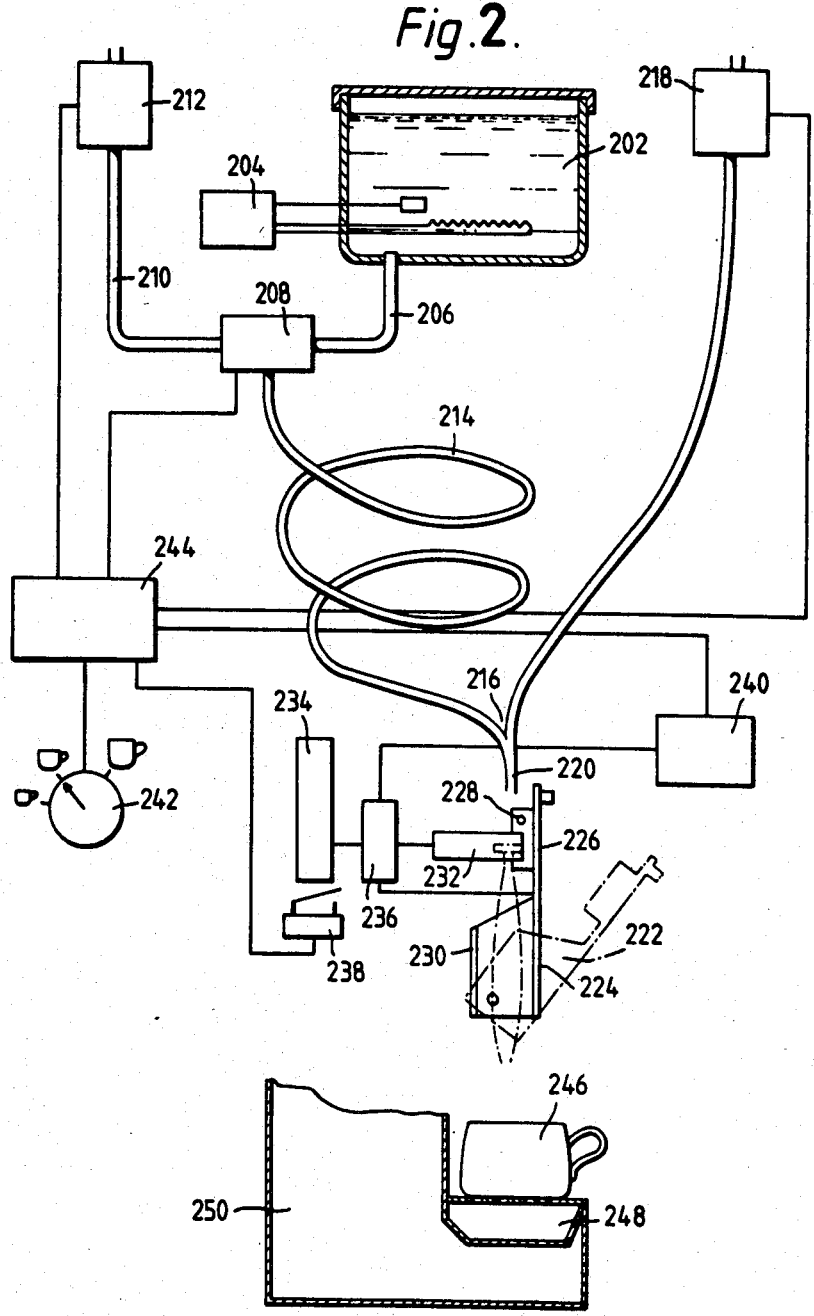

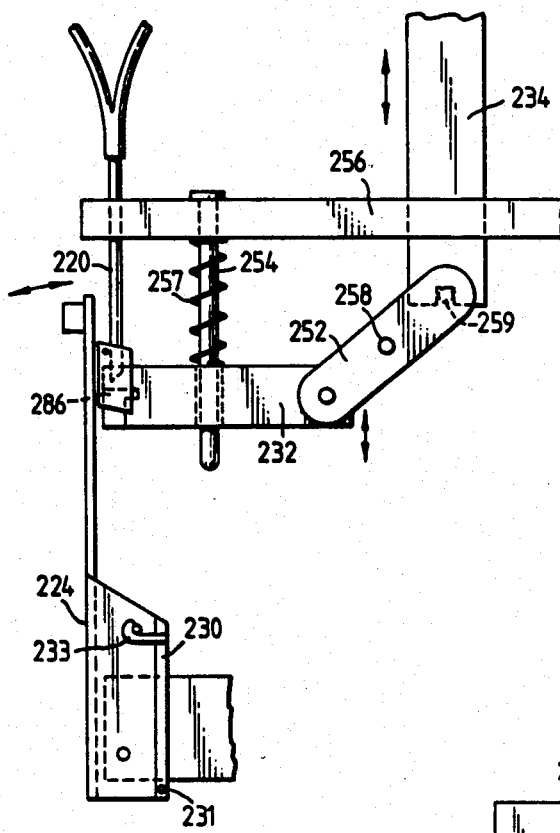
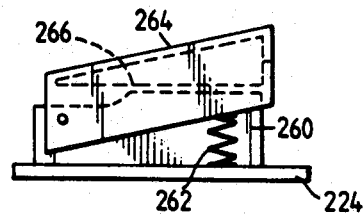
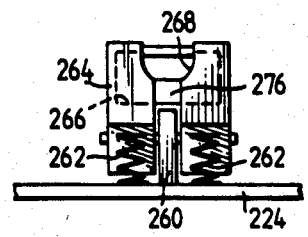
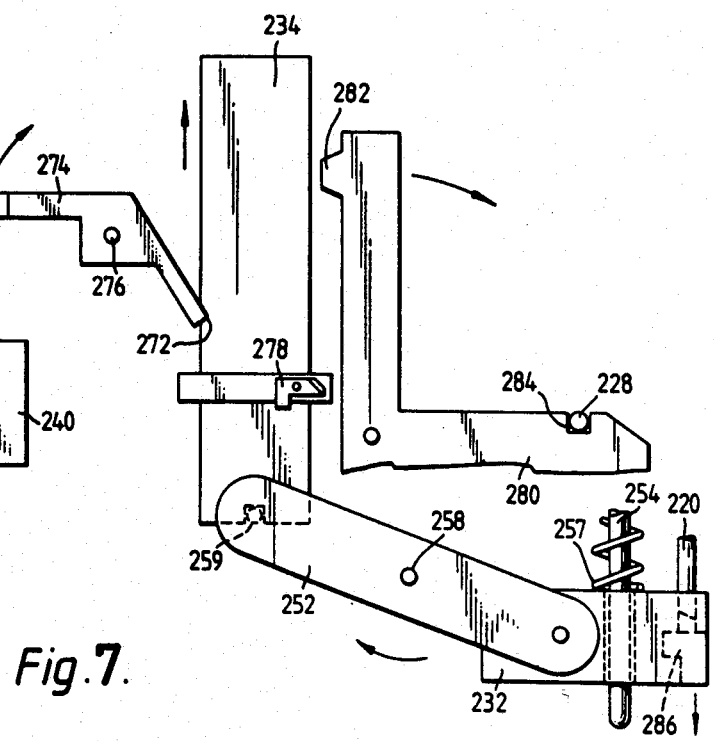

BEVERAGE PRODUCTION

This application is a division of application Ser. No. 513,229, filed July 13, 1983, now U.S. Pat. No. 4,581,239.

This invention relates to the production of beverages by brewing an infusible material, such as ground coffee or tea leaves, with an aqueous medium such as water.

The production of freshly-brewed coffee or tea involves contacting the ground coffee or leaf tea with water (normally hot) and separation of the beverage therefrom. There exist numerous techniques for such brewing, typical examples being steeping the infusible material in hot water, followed by filtration (e.g. the traditional tea-pot), continuous passage of water through the infusible material supported by a filter (e.g. coffee filters), and continuous recycling of infusing liquid (e.g. coffee percolators).

The speed and efficiency of extraction of materials from the ground coffee or tea leaves is not necessarily of prime concern in a domestic environment —where the brewing is under manual control. For example, with tea provided from a tea-pot, it is important to allow the tea to stand for a few minutes before pouring. Most people will accomplish this, but otherwise the brewing conditions vary immensely from person to person. However, when brewing is accomplished mechanically (e.g. in beverage vending machines), increased speed and/or efficiency of extraction can mean quicker dispensation of the product and/or a better value product (less infusible material being needed to provide a given level of extracted material).

We have now discovered that the speed and/or efficiency of brewing infused beverages may be increased by conducting the brewing with separate successive portions of fresh aqueous medium, and using each successive portion to resuspend and reagitate the infusible material.

Such a technique differs from the traditional tea-pot in that although the leaf tea may be re-agitated and re-suspended by stirring the pot from time to time, this is not accomplished with successive portions of fresh water which are then collected to provide the beverage.

According to one aspect of the invention there is provided a method of producing an infused beverage by brewing an infusible material with an aqueous medium, which comprises maintaining the infusible material in relation to a filter whereby the aqueous medium may be contacted with the infusible material and pass through the filter to leave the infusible material behind, contacting the aqueous medium with the infusible material in a plurality of successive discrete portions, each portion being added under conditions to suspend and agitate the majority of the infusible material and at least a part of each portion being displaced from the infusible material before the next succeeding portion re-suspends and re-agitates the infusible material and collecting the portions to provide the beverage.

In one preferred embodiment of the invention each portion is substantially completely removed from the infusible material before the next succeeding portion re-suspends and re-agitates the infusible material.

A beverage dispensing machine arranged and adapted to conduct these methods is also contemplated by the invention.

The aqueous medium portions may be of equal size or they may be unequal. It may be desirable to employ a first portion smaller or larger than succeeding portions and which serves mainly to wet the infusible material, enabling efficient brewing by subsequent portions of aqueous medium. This applies particularly to ground coffee, whose oily surface makes the need for a wetting stage highly desirable. Wetting may also be accomplished by removing the first aqueous medium portion rapidly under pressure. This forces the medium into contact with the infusible material By employing a number of portions of aqueous medium, the extraction efficiency is increased. Removing all, or substantially all of the aqueous medium before the next re-suspension and re-agitation provides the maximum opportunity for the fresh aqueous medium to contact the infusible material and extract the desirable beverage-producing components. The use of separate aqueous medium portions substantially reduces channeling through the wetted bed of infusible material. Channeling will always occur to some degree in filtration. It is highly desirable that it is reduced to a minimum in the invention so as to increase the efficiency of contact between the extracting liquid and the infusible material.

The conditions of the invention may be accomplished in several ways. The aqueous medium may be applied to the infusible material as a pulsed stream, each pulse being considered as one of the portions aforesaid. The introduction of each pulsed portion may itself be employed to displace the preceding pulsed portion; alternatively a different fluid medium may be introduced into the pulsed stream between each portion. Such different medium may be present under conditions simply to act as a buffer between successive aqueous portions or may be employed actively to displace the aqueous medium from the infusible material and through the filter.

If the portions of aqueous medium themselves displace preceding portions then inevitably there will be some mixing at the tail of one portion and the head of the next portion. This can be minimised so that each portion is displaced before the next re-suspension and re-agitation is anywhere near fully completed. It involves attempting to maintain as stable an interface between each portion as possible. Exactly how this is achieved depends upon the exact brewing conditions and materials, but generally speaking it is achieved when displacement of each portion occurs as rapidly as possible. This gives least opportunity for diffusion at the interface of successive portions.

If a different fluid medium is interspersed between each portion then it may be a gas, such as hot or cold air, or it could be steam. The medium may be introduced at atmospheric pressure e.g. by venting the brewing container to air, followed by application of the next portion of aqueous medium. Preferably however the medium is provided under pressure so as positively to displace the aqueous medium from the infusible material before the next aqueous medium portion arrives. The use of steam may be of benefit in assisting in extraction of some of the components of the infusible material. Steam may also be employed to provide the first wetting of the infusible material before the first brewing portion of aqueous medium is added.

In an alternative embodiment, the aqueous medium is supplied as a continuous stream, e.g. at low flow rate but at high pressure since this can serve to improve agitation, and removed from contact with the infusible material in successive discrete portions. From the point of view of the infusible material, contact with successive discrete portions of aqueous medium is thereby achieved.

The infusible material is preferably coffee or tea and the aqueous medium is preferably hot water. In some circumstances it may be desirable to employ an aqueous medium other than plain water, e.g. milk or sugar solution.

The filter may be any suitable porous retaining means, such as a material having a pore size to retain the infusible material yet allow the brewing aqueous medium to pass in an acceptable period of time. It may be, for example, a sheet material, such as a filter paper, or of more substantial thickness, such as a fibrous mat, supported within a brewing container. Where the brewing container is designed to be disposed of after use and is of water-impermeable material, the filter may be formed integrally with the container and provided by narrow channels passing through an area of the water impermeable material.

It is preferred that the infusible material and filter be held in a sealed container which is only opened when the beverage is being made, and which is disposed of after use. Preferably, the effective brewing volume of the container is less than the volume of the desired beverage so that the container is filled or substantially filled by at least some of the brewing portions of aqueous medium (this would not, of course, apply to a first small wetting portion, if employed).

The container may be an integral part of a beverage-dispensing machine which is re-used for each successive beverage requested, or it may be a disposable container such as a cartridge or capsule, or a flexible package such as a sachet. Means may be provided on the container to enable it to be machine-handled (such as located mechanically at a brewing station of a beverage dispensing machine) and/or to assist in liquid introduction or extraction (such as, for instance, input and/or output nozzles, or peel-off seals).

In one preferred embodiment the container is in sachet form; the sachet being constructed from substantially air- and water-impermeable sheet material. This material encloses the filter and the infusible material. The filter may be a sheet material itself enclosing the infusible material or it could be formed from the substantially air- and water-impermeable sheet material by forming narrow channels through an internal seam of the sheet material.

Typically to obtain a beverage from a flexible package such as a sachet, the top and bottom of the sachet are opened, aqueous medium added at the top and the beverage removed from the bottom (after infusion and passage through the filter). Preferably, the package is a sachet where means are provided on the sachet to enable it to be machine-handled and a water-introduction means to be positively located with respect to the package. Such means may be a nozzle sealed to the sachet and into which an injector in the form of a hollow needle (for passage of aqueous medium) is inserted in use.

Means may be provided for controlling the length of time each portion of aqueous medium is in contact with the infusible material. Such control is of especial advantage in beverage dispensing machines, where accurate control of dispense time is desirable. It also helps to provide a more even quality product. Time control may be accomplished in any number of ways —upstream and/or downstream of the brewing container or (especially if the latter is flexible) by manipulating the container itself. For example, valves may be provided upstream and/or downstream of the container.

Preferably control of the brewing cycle is accomplished by employment of a pressurised aqueous medium for brewing, the pressure, flow rate, and residence time being adjusted to give the desired brewing time both for each portion and overall. The pressure control may be pneumatic, for example the existence of a positive pressure, above atmospheric pressure, on and between each portion of aqueous medium. It may be applied as a negative pressure, by means of a vacuum downstream of the filter. It may also be mechanical, for example the provision of a pump or other mechanical force which presses the aqueous portions through the filter.

With a flexible package type of container, any number of mechanical devices may be employed to apply pressure to the package or to control extraction time. For instance, movable clamping jaws may be used to clamp and release an outlet channel of the package, or a means such as rollers running up and down the package or hydraulic or pneumatic bags may be used to squeeze the package.

Preferably, the container or package holding the infusible material is vented to atmosphere one or more times during the brewing cycle as the aqueous medium is being introduced into contact with the infusible material. Venting may be employed to control the timing of the contact time of the aqueous medium with the infusible material. Whilst the container or package is vented, the aqueous medium is introduced in the container or package at atmospheric pressure and tends to pass through the filter (under gravity only) only very slowly, if at all. To remove the beverage, the venting is discontinued and the liquid expelled under pressure by a further portion of aqueous medium or by another fluid such as air, as described above. A further advantage of venting, which applies particularly to sachets, is that it reduces the time for which each sachet is under pressure and thus reduces the risk of sachet rupture.

Venting can be arranged in various ways. For example, multiple fluid passageways for cooperation with the container or package may be employed—one for aqueous medium introduction and the other for venting or air introduction. If a sachet with nozzle arrangement is employed for the infusible material as described above (and in relation to FIG. 1, below) then a dual, coaxial channel hollow needle (injector) may be used for this purpose. Alternatively, a single hollow injector may be periodically disengaged from a simple nozzle during stages in the brewing cycle to enable venting to take place. The cooperation between the injector and nozzle may be a simple interference fit or involve a more complex arrangement such as bayonet-type locking fit. A further alternative may involve the cooperation of intercommunicating channels in the nozzle and injector which open or close as the injector and nozzle are rotated relative to one another.

BRIEF DESCRIPTION OF THE DRAWINGS

Preferred features of the invention will now be described with reference to the accompanying drawings, given by way of example, in which:

FIG. 1 is a perspective view of a sealed beverage package in the form of a sachet, for use in the invention, and FIGS. 2 to 7 are views of a preferred form of beverage dispensing apparatus according to the invention, FIG. 2 being schematic whereas FIGS. 3 to 7 illustrate certain components in more detail;

FIG. 6 is a perspective view of components of the apparatus adjacent its door, whereas FIGS. 4 and 7 are side views of various components. FIG. 5 and 6 are views along the lines X and Y respectively of FIG. 3. Components not essential to the understanding of the apparatus have been omitted from the drawings.

Referring to FIG. 1, the sealed beverage sachet preferred for use in the apparatus of the invention comprises a substantially air- and water-impermeable sheet material 102 which is a laminate of a layer of metallised polyester and a layer of polypropylene. The metallisation is sandwiched between the two plastics layers with the polypropylene layer innermost of the sachet. Enclosed within sheet material 102 is a filter sheet material 104 which is a laminate formed of spun-bonded and melt-blown polypropylene. The materials 102 and 104 have bottom folds 106 and 108, respectively. Fold 106 is lower than fold 108 to provide a chamber 110 below the lowest level of material 104. The side edges of materials 102 and 104 are sealed together to form a pocket which contains ground coffee 112. The top edge of the sachet is also sealed and contains a nozzle 114 having a central water delivery channel 116, a top flange 118 and side fins 120. The water delivery channel 116 is closed with a flashing 122. The top flange 118 enables the sachet to be supported thereby in the beverage dispensing apparatus. When flashing 122 is broken, water may be introduced into the sachet via channel 116. The side fins 120 taper outwardly (when viewed in plan) to each side from the barrel of the nozzle. These fins provide a larger area for efficient sealing of the nozzle to the material 102.

In use, as to be described in detail later, the material 102 is severed in the region of chamber 110 to provide an outlet and the sachet is supported at an aqueous medium introducing station. Aqueous medium, typically hot water, is introduced into the sachet through channel 116 from a hollow water injector which pierces flashing 122 and seals against the side wall of channel 116. The water infuses with the ground coffee, is filtered, and passes out the outlet formed in the severed base of the sachet where it is collected in a suitable container.

The apparatus now to be described with reference to FIGS. 2 to 7 is designed to provide beverages from a sachet such as that illustrated in FIG. 1. It is designed particularly, but not exclusively, for the provision of freshly-brewed tea or coffee in an environment where a full degree of automation of beverage dispensing, or where a beverage vending mechanism, is not required. Such an environment is typically an office. For the purposes of this description, the supply of freshly-brewed coffee will be described, although other beverages could equally well be supplied.

Referring to FIGS. 2 to 7, the apparatus comprises a water reservoir 202 containing a heater/thermostat assembly 204 sufficient to maintain the water at about 96° C. A water outlet 206 leads to an electrically-operable three-port valve 208. A second inlet 210 to the latter leads from an air pump 212 such that either air or water is delivered downwardly into delivery tube 214. The latter terminates at one branch of a Y-junction 216, the other upper branch of which leads from an electrically-operable air venting valve 218. The lower branch of junction 216 terminates in an injector 220 having a knife-edged exposed lower opening to facilitate piercing of the covering on a sachet nozzle. (The sachet is shown in dotted form in FIG. 2).

A hinged door 222 is supported such that it normally rests open (shown in dashed lines in FIG. 2) and comprises a front wall 224 carrying a sachet support member 226 and door latching pin 228. A back wall 230 separate from the front wall and hinged to side walls of the door at 231 extends upwardly from the foot of the door and spaced from the front wall 224. There is an open base to the door between the front and back walls and the back wall extends only partially to the height of the front wall. The door 222 is easily removable from its hinges to enable it to be conveniently cleaned. The movement of the back wall 230 about its hinge 231 is restricted by a pair of hook and pin assemblies 233, one each side of the back wall.

A claw support 232 is normally disposed immediately below injector 220 but in use is urged upwardly by depression of an actuator arm 234. The upwardly-urged claw support 232 and depressed actuator arm 234 are latched in this position by a latch mechanism 236. The latter also cooperates with latching pin 228 to lock the door when closed. A microswitch 238 is disposed adjacent actuator arm 234 and is closed thereby when the arm 234 is depressed. The latching mechanism is connected to, and released by operation of, a solenoid 240.

A beverage size selector knob 242 is coupled to an electromechanical cam timer 244 which controls the operation of three-port valve 208, air pump 212, air venting valve 218, and solenoid 240.

A suitable container 246 for receipt of the desired beverage is placed immediately below door 222 and injector 220, supported upon a drip tray 248. Behind drip tray 248 is disposed a waste sachet receipt bin 250.

The valves, pump, heater/thermostat, solenoid, and cam timer components are standard and require no further description. A more detailed explanation of the other components now follows with reference to FIGS. 3 to 7. It will be appreciated in these Figures that the casing and support walls for the various components have been omitted for clarity.

Claw support 232 is pivotably supported by a pair of pivot arms 252 and slidably in relation to a vertical support shaft 254 depending downwardly from fixed casing support surface 256. Pivot arms 252 pivot about a horizontal shaft 258 supported by fixed casing side walls (omitted for clarity). The ends of arms 252 remote from claw support 232 are joined by a bar 259 which sits in a recess at the base of actuator arm 234. A spring 257 biasses the actuator arm 234/claw support 232/pivot arms 252/bar 259 assembly such that the claw support 232 is normally in its down or lowermost position as illustrated in FIG. 4.

Referring to the detail shown in FIGS. 5 and 6, the sachet support member 226 is pivoted to a fixed tongue member 260 which upstands perpendicularly from front wall 224. Springs 262 bias the support member 226 away from the front wall 224. The support member 226 has side walls 264 and base 266, and one side wall 264 possesses a recess 268 of a size to accommodate snugly a sachet nozzle. Support member 226 is slotted at 270 such that, upon depression of member 226 against the bias of springs 262, the member 226 rests flush against front wall 224 and tongue member 260 enters slot 270 and into recess 268.

The latching and release mechanism is illustrated in FIG. 7. The actuator arm 234 possesses a detent 272 into which the tongue of a release trigger 274 enters. The trigger 274 is counter weighted about a pivot 276 such that the tongue normally rests in detent 272 and is only released by upward force provided by solenoid 240. A flange 274 on actuator arm 234 limits motion upwardly and downwardly by abutment against components of the casing support surface 256 (not shown in FIG. 7) and also supports a pivotable cam arm 278. A pivotable latch arm 280 has a cam surface for cooperation with cam arm 278 and a detent 284 for cooperation with door latching pin 228. As shown in FIG. 7, the apparatus is shown with the claw support 232 in its uppermost position, the actuator arm 234 thus being held down by release trigger 274 and the door locked by latch arm 280.

The apparatus operates as follows. The desired size of beverage (small, medium or large size cup) is set at selector knob 242. A sachet as illustrated in FIG. 1 and containing ground coffee is selected from a supply thereof and the bottom edge removed by cutting. The sachet is placed inside the open door 222, in the space between the front and back walls 224, 230, with the sachet nozzle accommodated within the support member 226. The top flange 118 of the nozzle rests within the side walls 264 and against the base 266. The waisted-portion of the nozzle leading to the sachet proper rests within recess 268, and the sachet proper rests against the inside surface of front wall 224. The door is closed and latches thus by cooperation of latching pin 228 in detent 284 of latch arm 280 (FIG. 7). When the door is closed, the support member 226 is pressed against the claw support 232. The action of closing the door compresses the support member 226 against the door front wall 224. The tongue member 260 enters slot 270 and pushes the sachet nozzle onto the claws of claw support 232 at a position immediately below injector 220. To accommodate this function, the claw support 232 comprises a slot 286 complementing the shape of the sachet nozzle and its upper flange.

The operator then depresses actuator arm 234. Claw support 232 thus moves upwardly against the bias of spring 257, causing the knife-edged opening of injector 220 to pierce and enter the sachet nozzle. The arm 234/claw support 232 assembly latches in this position through cooperation of the detent of actuator arm with the tongue of release trigger 274. Depression of actuator arm 234 closes microswitch 238 to actuate cam timer 244 into a programmed sequence of operation of the components it controls. The apparatus is designed to pass hot water through the sachet in a series of discrete portions. To this end, the cam timer 244 actuates a given sequence cyclically a given number of times (cycles) depending upon the size of beverage selected by selector knob 242. One complete cycle of the programmed sequence provides one of the series of discrete portions of hot water. In this embodiment, each portion is approximately 28 ml. in volume. Selection of the "large cup" size by knob 242 causes cam timer 244 to run through the programmed sequence six times (six cycles) thus providing an approximately 175 ml. size of beverage (allowing 13 ml. wastage of liquid retained in the spent sachet). Selection of other sizes by knob 242 causes the cam timer to provide a lesser number of cycles of the programmed sequence, respectively, to so produce smaller-sized beverages.

The programmed sequence is as follows. Initially the air pump 212 is off, the venting valve 218 is closed, the three-port valve 208 in a position to block passage of water from outlet 206 to tubing 214. The solenoid 240 is in an inactive state to maintain the latching mechanism provided via release trigger 274. The air venting valve 218 opens, and the three way valve 208 actuated to admit hot water under gravity into tubing 214. The air venting valve 218 then closes whilst three-port valve 208 switches over to connect air inlet 210 to tubing 214, thus disconnecting the supply of water. The air pump 212 simultaneously switches on. The pumped air (at approximately 4 psig) forces the water in tubing 214 through injector 220 and into the sachet. The timing of operation of valves 208, 218 and pump 212 is such that the flow rate of water into and through tubing 214 is used as the volumetric gauge to control the supply of the amount of hot water.

With the hot water now in the sachet, the air pump 212 is switched off, thus giving a pause during which time the hot water infuses with the ground coffee material and drips into container 246 only very slowly, if at all. The air pump 212 is then switched on again and the air so pumped forces the hot coffee out of the bottom of the sachet into container 246. The air pump switches off and completes one complete cycle of the programmed sequence.

The cycle is repeated 3 to 5 more times, depending upon the size of drink selected. At the end of the last cycle, the cam timer extends the final air blast through the sachet so that substantially all remaining liquid is expelled into container 246. From the point of view of the sachet, the sequence is:

1. Pause whilst water runs from reservoir 202 into tubing 214 (approx. 1 second),
2. Water enters sachet under the pressure of the air pumped into tubing 214 (approx. 0.8 seconds),
3. Pause to allow the beverage to infuse and develop in the sachet (approx. 1.5 seconds),
4. Pumped air enters sachet to expel the liquid into the container (approx. 0.7 seconds),
5. Repeat steps 1 to 4 from 3 to 5 times, with the last step 4 being extended in time to approximately 4 seconds.

After the final air blast (step 4), the air pump 212 is finally switched off.

The sachet is then vented to atmosphere via valve 218, and the solenoid 240 is actuated. This actuates release trigger 274 and releases the tongue of the latter from the detent in actuator arm 234. The actuator arm 234 raises and the claw support 232 lowers under the bias of spring 257. The nozzle of the sachet is pulled off the end of injector 220 by this action. Raising of actuator arm 234 simultaneously raises cam arm 278 which, in cooperation with cam surface 282, causes latch plate 280 to rotate (clockwise in FIG. 7), thus releasing the door latching pin 228 from detent 284. The door 222 drops open. The back wall 230 of the door maintains an upright position until the hook and pin assemblies 233 engage. At this stage the front and back walls 224 and 230 present a pair of slightly-open jaws to the spent sachet therebetween. The door back wall 230 then pivots forward with the rest of the door and catches against the spent sachet which is now just resting by its nozzle in claw support channel 286. The door opening action thus pulls the spent sachet off claw support 232 and the sachet falls downwardly, and obliquely with the opening motion of the door, into the bin 250. The container 246 with its dispensed beverage is removed and the apparatus is ready to provide a further beverage if desired. The provision of a hinged back wall and presentation of a pair of slightly-open jaws to the spent sachet provides more efficient disposal of the sachet into the bin 250.

Although the apparatus so described is not provided with a vending function, such can of course be provided by, for example, coupling a sachet dispensing station with a coin-freed mechanism and/or by coupling the water dispensing apparatus to such mechanism. If desired, the apparatus may be modified in numerous ways. For example, a cutting mechanism for the base of the sachet may be provided. Various safety circuits may also be incorporated. For example, if a user inserts a unopened sachet, the apparatus initially attempts to force hot water into it. The sachets are of such strength to resist the 4psig entry force without splitting. However a pressure sensor may be incorporated to detect this and to terminate the dispensing cycle as needs be for safety. The water injector 220 may have a tapered opening to provide more efficient entry, cutting into, and sealing with the sachet nozzle.

If a cutter is provided in the apparatus before the sachet reaches the water introducing station, an interlock may be provided between the cutter and the operating components at the water introducing station. This will ensure that the cutter is employed before a sachet reaches the station and reduce any risk of an unopened sachet reaching the station.

In an alternative embodiment not illustrated, the spent sachet is ejected into the waste sachet disposal station 250 without the hinged door 222 re-opening. In this arrangement the door does not possess a hinged back wall 230 and the spent sachet is ejected from the support provided by the claw support 232 by an ejector mechanism.

The apparatus may also be designed to dispense beverages of different strengths. This may be achieved not only by variation in sachet design, by selection of the particular type of infusible material or its particle size, but also by variation in the timing and size of the shots of infusing liquid and purging air. For example, to provide a stronger coffee, as favoured in Continental Europe, a finer ground coffee is employed in the sachet. The first shot of infusing hot water is increased in volume and is allowed to remain in contact with the coffee for a longer period of time. This allows the coffee grounds to be thoroughly wetted. A stronger coffee beverage is thus provided.

Other means may be provided for increasing the extraction efficiency of the apparatus. Generally-speaking efficiency increases the more the beverage-providing particles are agitated during beverage production. Preferably, the portions of aqueous medium suspend and agitate substantially all of the infusible material. The formation of a filter cake may reduce efficiency by, for example, preventing total resuspension. Additional agitation may be provided by vibrating the sachet or, for example, by inverting it during the period in each cycle when liquid pauses in the sachet to allow the beverage to infuse and develop. During such a pause, air may be passed through the inverted sachet to keep the particles in constant agitation. The sachet is then re-inverted to its normal position to allow the shot of liquid to be expelled.

The following Examples also illustrate the invention.

EXAMPLES 1 and 2

Individual cups of coffee were produced employing 6 grams of good quality ground coffee infused with 170 ml. water at 92° C. In each case the coffee beverage was produced for drinking in 20 seconds.

In a first control run, the coffee was held in the filter cup of a standard coffee vending machine. The hot water was run through the machine over the 20 second cycle. The cycle was essentially in three stages: (1) coffee and water mixing, (2) infusion, (3) filtration.

In a second control run and in Examples 1 and 2 the coffee was held enclosed in filter paper, itself held in a sachet of substantially air- and water-impermeable sheet material. A water-introduction plastics nozzle (having its inlet channel of 0.3 cm diameter closed with a thin plastics flashing) was sealed in the top seam of the sachet. The flashing was pierced by introduction of a hollow needle into the inlet channel of the nozzle. The bottom of the sachet was severed below the lowest level of the filter paper (so that the ground coffee did not run out of the sachet).

The supply of hot water was controlled by a water pump leading to one way of a three way valve. The second way of the valve was connected a supply of air at 2 psig, whereas the third way led from the valve to the hollow needle. The valve could thus be employed to control the supply of either pumped hot water or compressed air to the sachet.

In the second control run, the air supply was not employed, and the 170 ml. of hot water was pumped as a continuous stream through the sachet over a period of 20 seconds.

In Example 1 according to the invention, 85 ml. water was added to the sachet over an 8 second period and then the compressed air applied for 2 seconds. This 10 second cycle was repeated once.

In Example 2 according to the invention 42.5 ml. water was added over a 4 second period and then compressed air applied for 1 second. This 5 second cycle was repeated three more times.

The results were as follows:

|  | Percentage Extracted Product* |
| --- | --- |
| First control | 17.5 |
| Second control | 18 |
| Example 1 | 20 |
| Example 2 | 23 |

*Percentage Extracted Product $= \frac{\text{weight of extracted solubles} \times 100\%}{\text{weight of coffee}}$

EXAMPLES 3–5

In these Examples a different good quality ground coffee was employed. A third control run, similar to the first control run, was conducted using the standard coffee vending machine and the different construction described for Examples 1 and 2.

In Example 3, 42.5 ml. hot water was pumped into the sachet over a period of 2.5 seconds, followed by the application of compressed air for 2.5 seconds. This 5 second cycle was repeated three more times.

In Example 4, the compressed air supply was replaced with steam at just above atmospheric pressure (approximately 2–5 psig). 42.5 ml. water was pumped into the sachet over a period of 2.5 seconds, followed by the application of steam for 2.5 seconds. This 5 second cycle was repeated three more times.

In Example 5, 42.5 ml. water was pumped into the sachet over a period of 2.5 seconds and then the pump and water valve shut off for 2.5 seconds. This 5 second cycle was repeated twice. A final, fourth 42.5 ml. water portion was added over 2.5 seconds and then purged out of the sachet with the application of compressed air for 2.5 seconds. In this Example, although a little of each of the first three water portions flowed through the filter and out of the sachet during the pause period, the majority was displaced by the succeeding, incoming portion.

For all of these Examples and controls the beverage was prepared in 20 seconds.

The results were as follows:

|  | Percentage Extracted Product |
|---|---|
| Third control | 16.4 |
| Example 3 | 24.7 |
| Example 4 | 24.6 |
| Example 5 | 23.3 |

It will be observed from these Examples and Controls that, in the Examples according to the invention, the amount of material extracted from the coffee was substantially higher than in the Controls. It was also noticeable that the Example using steam (Example 4) provided a beverage with a noticeably different taste to its nearest comparison (Example 3).

We claim:

1. A beverage dispensing apparatus for producing an infused beverage comprising:
    means to heat a supply of an aqueous medium,
    delivery means to direct portions of said heated aqueous medium to a heated aqueous medium discharge outlet,
    said discharge outlet adapted to be placed in operable communication with an infusible beverage product retained in a filter medium,
    means cooperable with said delivery means to inject selectively and sequentially discrete and measured quantities of said heated aqueous medium to said discharge outlet, and
    means associated with said delivery system to deliver a pressurized medium at a pressure above atmospheric pressure to said discharge outlet in sequence following the delivery of said discrete and measured quantities of said heated aqueous medium therby to agitate and suspend said infusible beverage product retained by said filter medium.

2. An apparatus according to claim 1 wherein said means to deliver a pressurized medium comprises means for providing a fluid under pressure to displace said aqueous medium.

3. An apparatus according to claim 1 further comprising means to releasably support and engage an infusible beverage product retained in said filter in a container.

4. An apparatus according to claim 1 comprising means for enabling said aqueous medium to contact said infusible material at atmospheric pressure.

5. An apparatus according to claim 1 including timing means for controlling the time required to produce a beverage and program means enabling the apparatus to provide a plurality of preset operations for producing said beverage.

6. An apparatus according to claim 5 wherein said program means comprises cycle means enabling a plurality of preset operations to be repeated one or more times for producing said beverage.

7. An apparatus according to claim 5 or 6 wherein said program means comprises means to supply aqueous medium to the infusible material, means to provide a pause enabling substantially all the aqueous medium to be held in contact with the infusible material, and means to eject the aqueous medium from contact with the infusible material under pressure.

8. An apparatus according to any of claims 1, 2, 3, 4 or 5 which comprises means for enabling beverages of different sizes to be selected and dispensed.

9. An apparatus according to any of claims 1, 2, 3, 4 or 5 which comprises means for enabling beverages of different strengths to be selected and dispensed.

* * * * *